United States Patent
Nakagawara (10) Patent No.: US 10,104,301 B2
(45) Date of Patent: Oct. 16, 2018

(54) IMAGE PICKUP APPARATUS THAT PERFORMS PROCESS OF DETECTING CHANGE IN BRIGHTNESS, CONTROL METHOD THEREFOR, AND STORAGE MEDIUM

(71) Applicant: CANON KABUSHIKI KAISHA, Tokyo (JP)

(72) Inventor: Naoyuki Nakagawara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/223,195

(22) Filed: Jul. 29, 2016

(65) Prior Publication Data
US 2017/0041522 A1    Feb. 9, 2017

(30) Foreign Application Priority Data
Aug. 7, 2015    (JP) .................................. 2015-157556

(51) Int. Cl.
*H04N 5/235*    (2006.01)
*H04N 5/232*    (2006.01)

(52) U.S. Cl.
CPC ........... *H04N 5/235* (2013.01); *H04N 5/2357* (2013.01); *H04N 5/23229* (2013.01)

(58) Field of Classification Search
CPC ... H04N 5/235; H04N 5/2357; H04N 5/23229
USPC .................................. 348/226.1, 227.1, 228.1
See application file for complete search history.

(56) References Cited

U.S. PATENT DOCUMENTS 8,405,739 B2 * 3/2013 Tanaka ............... H04N 5/23212
                                                            348/221.1
9,307,163 B2 * 4/2016 Aota .................... H04N 5/2357

FOREIGN PATENT DOCUMENTS

JP    2007-060585 A    3/2007

* cited by examiner

*Primary Examiner* — Albert Cutler
(74) *Attorney, Agent, or Firm* — Cowan, Liebowitz & Latman, P.C.

(57) ABSTRACT

An image pickup apparatus capable of appropriately performing a flicker detection process depending on presence or absence of flicker. A detection unit performs a detection process of detecting a change in brightness or a detection process set in advance other than the detection process of detecting the change in brightness depending on an image acquired by picking up a subject every predetermined detection cycle. A control unit controls a frequency to perform the detection process of detecting the change in brightness and a frequency to perform the detection process set in advance using the detection unit depending on a result of the detection of the change in brightness performed by the detection unit at a time of picking up the subject.

17 Claims, 10 Drawing Sheets

IMAGE PICKUP APPARATUS THAT PERFORMS PROCESS OF DETECTING CHANGE IN BRIGHTNESS, CONTROL METHOD THEREFOR, AND STORAGE MEDIUM

BACKGROUND OF THE INVENTION

Field of the Invention

The present invention relates to an image pickup apparatus, a control method therefor, and a storage medium, and particularly to an image pickup apparatus that performs exposure at a timing at which a change in brightness caused by flicker is small.

Description of the Related Art

Recently, it is possible to shoot an image without any blur even with a high-speed shutter under a relatively dark environment such as an interior along with an increase in sensitivity of an image pickup device to be used in an image pickup apparatus such as a digital camera. On the other hand, a so-called flicker phenomenon in which illumination light cyclically fluctuates is generated due to influence of a commercial power frequency in a fluorescent light which is used as an indoor light source. Further, when the shooting is performed with the high-speed shutter under a flicker light source such as the fluorescent light, a variation in exposure and color temperature of an image is generated for each frame due to the influence of the flicker. Furthermore, there is a case in which unevenness in exposure and unevenness in color are generated in a single frame.

An image pickup apparatus, which detects a period and a phase of flicker and performs exposure in accordance with a timing at which a change in brightness is small, is proposed in order to deal with the above-described problems (see Japanese Laid-Open Patent Publication (kokai) No. 2007-60585).

Meanwhile, when time elapses after detecting the flicker, a relation between an optimal exposure timing, which is determined at the time of flicker detection, and an optimal exposure timing at the time of shooting deviates due to the influence of a fluctuation in the commercial power frequency in some cases. In general, it is said that a fluctuation in the commercial power frequency is about ±0.3 Hz (a fluctuation in a flicker frequency of a flicker light source is about ±0.6 Hz). Thus, there is a possibility that an exposure timing deviates as time elapses after a flicker detection even if the flicker detection is once performed to obtain an exposure timing at which the change in brightness caused by the flicker is small.

It is necessary to frequently perform the flicker detection with a cycle in which the deviation of exposure timing does not occur in order to deal with such a fluctuation in the commercial power frequency. However, a normal photometric frequency decreases when the flicker detection is frequently performed. Further, it is difficult to perform an exposure control in real time when the normal photometric frequency decreases. On the other hand, it is necessary to decrease detection frequency of a subject to prevent the normal photometric frequency from decreasing, for example, in order to perform the exposure control in real time.

In this manner, the frequency of the normal photometry or the subject detection decreases when the frequency of the flicker detection increases, which prevents a user from obtaining a desired image.

SUMMARY OF THE INVENTION

The present invention provides an image pickup apparatus, a control method thereof, and a storage medium capable of appropriately performing a flicker detection process depending on presence or absence of flicker.

Accordingly, the present invention provides an image pickup apparatus comprising a detection unit configured to perform a detection process of detecting a change in brightness or a detection process set in advance other than the detection process of detecting the change in brightness depending on an image acquired by picking up a subject every predetermined detection cycle, and a control unit configured to control a frequency to perform the detection process of detecting the change in brightness and a frequency to perform the detection process set in advance using the detection unit depending on a result of the detection of the change in brightness performed by the detection unit at a time of picking up the subject.

According to the invention, a frequency of detection of a change in brightness is changed depending on a detection result of the change in brightness such as flicker, and thus, it is possible to appropriately perform a process of detecting the change in brightness such as the flicker.

Further features of the present invention will become apparent from the following description of exemplary embodiments (with reference to the attached drawings).

BRIEF DESCRIPTION OF THE DRAWINGS

FIGS. 3A and 3B are diagrams for describing electric charge accumulation and electric charge reading performed by a photometric sensor illustrated in FIG. 1.

FIGS. 5A and 5B are diagrams for describing photometric sequences illustrated in FIG. 2.

FIGS. 7A and 7B are diagrams for describing photometric sequences illustrated in FIG. 6.

DESCRIPTION OF THE EMBODIMENTS

Hereinafter, a description will be given regarding an example of an image pickup apparatus according to embodiments of the present invention with reference to the drawings.

Figure 1:
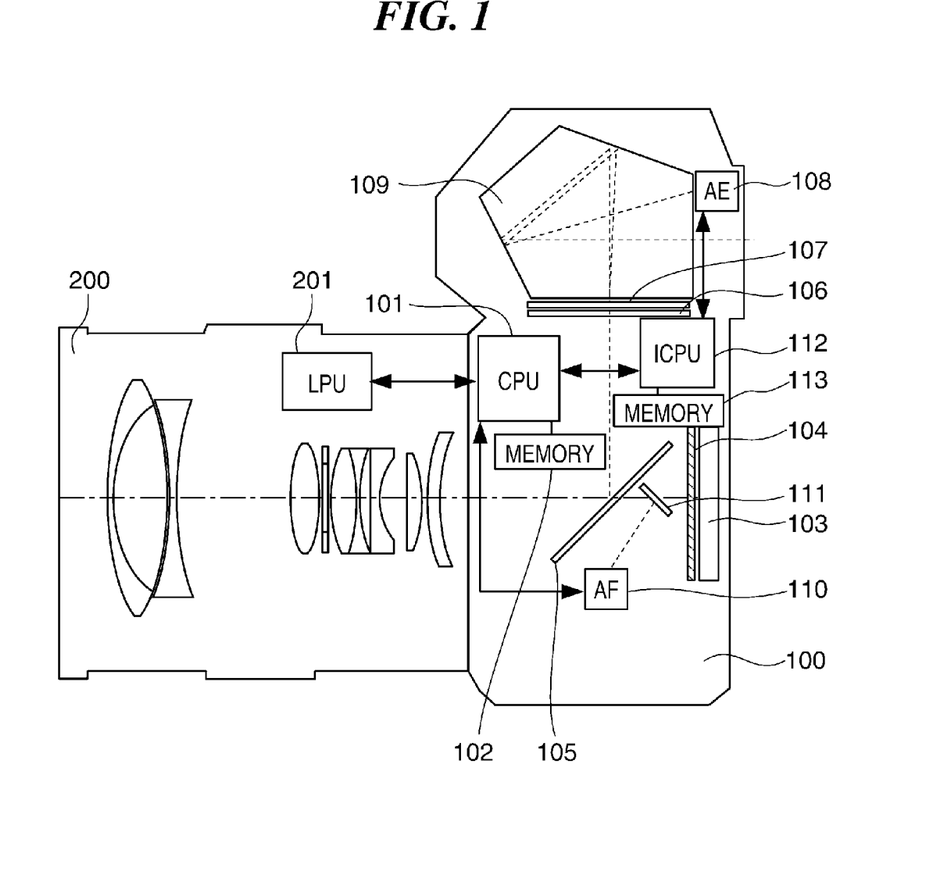
FIG. 1 is a cross-sectional view illustrating a configuration of an example of an image pickup apparatus according to a first embodiment of the present invention.

FIG. 1 is a cross-sectional view illustrating a configuration of an example of an image pickup apparatus according to a first embodiment of the present invention. It should be noted that one or more functional blocks illustrated in FIG. 1 may be implemented by hardware such as an ASIC and a programmable logic array (PLA), or may be implemented by causing a programmable processor such as a CPU and an MPU to execute software. In addition, the one or more functional blocks may be implemented by combination of software and hardware. Accordingly, even when different functional blocks are described as operation entities, the same hardware may be implemented as the entity in the following description.

The image pickup apparatus illustrated in FIG. 1 is a so-called single-lens reflex digital camera (hereinafter, simply referred to as a camera), and includes a camera main body 100 and a taking lens unit (hereinafter, simply referred to as a taking lens) 200. Further, the taking lens 200 can be replaced with respect to the camera main body 100. It should be noted that the present invention may employ a camera in which the camera main body 100 and the taking lens 200 are integrally configured.

The camera main body 100 is provided with a microcomputer (CPU: a camera microcomputer) 101, and the camera microcomputer 101 controls the camera main body 100 and the taking lens 200. A memory 102 such as a RAM and a ROM is connected to the camera microcomputer 101. It should be noted that the camera microcomputer 101 is a control unit that controls various types of processing and operations to be executed using an image which is output from a photometric sensor 108 to be described later.

The camera main body 100 is provided with an image pickup device 103, and the image pickup device 103 is arranged on an optical axis of the taking lens 200. The image pickup device 103 is, for example, a CCD or CMOS sensor including an IR cut filter, a low-pass filter and the like, and an optical image (subject image) is formed on the image pickup device 103 via the taking lens 200 at the time of shooting.

A shutter 104 is arranged in front of the image pickup device 103, shields the image pickup device 103 from light at the time of non-shooting and opens to guide the optical image to the image pickup device 103 at the time of shooting. A half mirror (main mirror) 105 is arranged at a front stage of the shutter 104. A focusing screen 106 is arranged above the half mirror 105, and the half mirror 105 reflects light incident via the taking lens 200 and causes an optical image to be formed on the focusing screen 106 at the time of non-shooting.

A display element 107 is arranged on an upper surface of the focusing screen 106. For example, a PN liquid crystal is used as the display element 107, and an AF distance measurement frame, an image size, white balance setting, warning display at the time of detecting flicker, and the like are displayed on the display element 107.

A pentaprism 109 is arranged above the display element 107, and the pentaprism 109 guides the optical image formed on the focusing screen 106 to the photometric sensor (AE) 108 and an optical finder (not illustrated). The photometric sensor 108 views the optical image formed on the focusing screen 106 from an inclined position via the pentaprism 109.

The photometric sensor 108 is a sensor which is capable of picking up a subject and acquiring image data (hereinafter, simply referred to as an image), and for example, the image pickup device such as the CCD or CMOS sensor is used as the photometric sensor 108. Further, based on the image acquired using the photometric sensor 108, not only photometry but also a process of detecting and tracking a subject included in the image, and further, a process of detecting a flicker (hereinafter, referred to as a flicker detection) are performed. A light amount change cycle (hereinafter, simply referred to as a cycle) of a flicker light source and a characteristic point (a peak or a bottom) of the flicker are detected in the flicker detection. Although the photometric sensor 108 is used for the flicker detection in the example illustrated in FIG. 1, the flicker detection may be performed using an output of the image pickup device 103.

Light, which has been incident via the taking lens 200 and transmitted through the half mirror 105, is guided to a focus detection circuit (AF) 110 by an AF mirror 111. The focus detection circuit 110 is provided with an AF sensor (not illustrated), and the focus detection circuit 110 performs distance measurement (focus detection) using the AF sensor.

An ICPU 112 performs drive control of the photometric sensor 108 and image processing with respect to the image obtained by the photometric sensor 108 under control of the camera microcomputer 101. Further, the ICPU 112 controls various types of processing such as detection and tracking of subject, light source detection, a photometry, and flicker detection. A memory 113 such as a RAM and a ROM is connected to the ICPU 112. It should be noted that the camera main body 100 is provided with the ICPU 112 in addition to the camera microcomputer 101 in the example illustrated in FIG. 1, but the camera microcomputer 101 may perform the processing that is performed by the ICPU 112.

The taking lens 200 is provided with a lens microcomputer (LCPU) 201, and the lens microcomputer 201 transmits distance information, which indicates a distance between the camera and the subject, to the camera microcomputer 101 in a manner described later.

Figure 2:
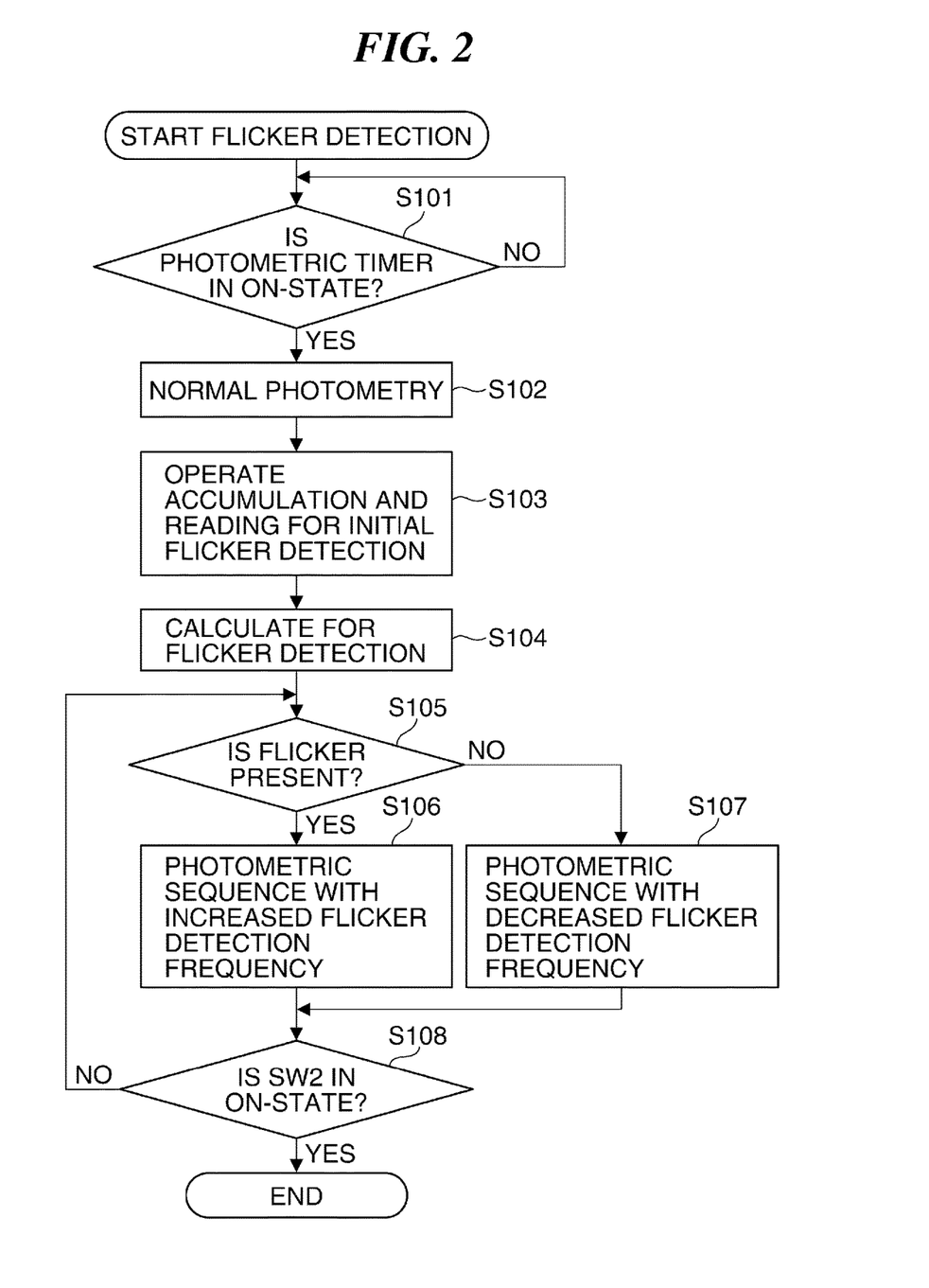
FIG. 2 is a flowchart for describing a flicker detection process which is performed by a camera illustrated in FIG. 1.

FIG. 2 is a flowchart for describing a flicker detection process which is performed by the camera illustrated in FIG. 1. It should be noted that the process according to the flowchart illustrated in FIG. 2 is performed under the control of the camera microcomputer 101.

When a power of the camera is turned on, the camera microcomputer 101 determines whether a photometric timer (not illustrated) is in an ON-state, that is, the state of allowing photometry (step S101). It should be noted that the photometric timer is turned on when the power of the camera is turned on, a shutter button (not illustrated) is half pressed to turn a first shutter switch SW1 into an ON-state (according to an instruction of preparation for image pickup). Further, the photometric timer is turned off when the camera is not operated for a predetermined time period.

When the photometric timer is in an OFF-state (NO in step S101), the camera microcomputer 101 stands by. On the other hand, when the photometric timer is in the ON-state (YES in step S101), the camera microcomputer 101 controls the ICPU 112 to perform a normal photometry process (step S102). In this normal photometry process, the ICPU 112 sets an electric charge accumulation time of the photometric sensor 108 substantially to an integer multiple of a cycle of a flicker under the control of the camera microcomputer 101 such that a variation does not occur in a photometric value with respect to a change in brightness caused by the flicker even under the flicker light source.

A frequency that the brightness of the flicker light source changes is twice the frequency of the commercial power, and thus, the frequency (brightness frequency) that the brightness changes is 100 Hz, and a light emitting cycle thereof is 10 ms when the commercial power frequency is 50 Hz. Similarly, the brightness frequency is 120 Hz, and the light emitting cycle is 8.33 ms when the commercial power frequency is 60 Hz.

When the electric charge accumulation time of the photometric sensor 108 is set to about 9 ms between 10 ms and 8.33 ms in order to correspond to the above-described two brightness frequencies, the photometric sensor 108 accumulates electric charges corresponding to substantially one cycle of the flicker if the commercial power frequency is any of 50 and 60 Hz. Accordingly, the ICPU 112 can stably obtain the photometric value even when the flicker is present.

Subsequently, the ICPU 112 controls the photometric sensor 108 under the control of the camera microcomputer 101, and performs the electric charge accumulation and electric charge reading for the flicker detection (step S103).

Figure 3A:
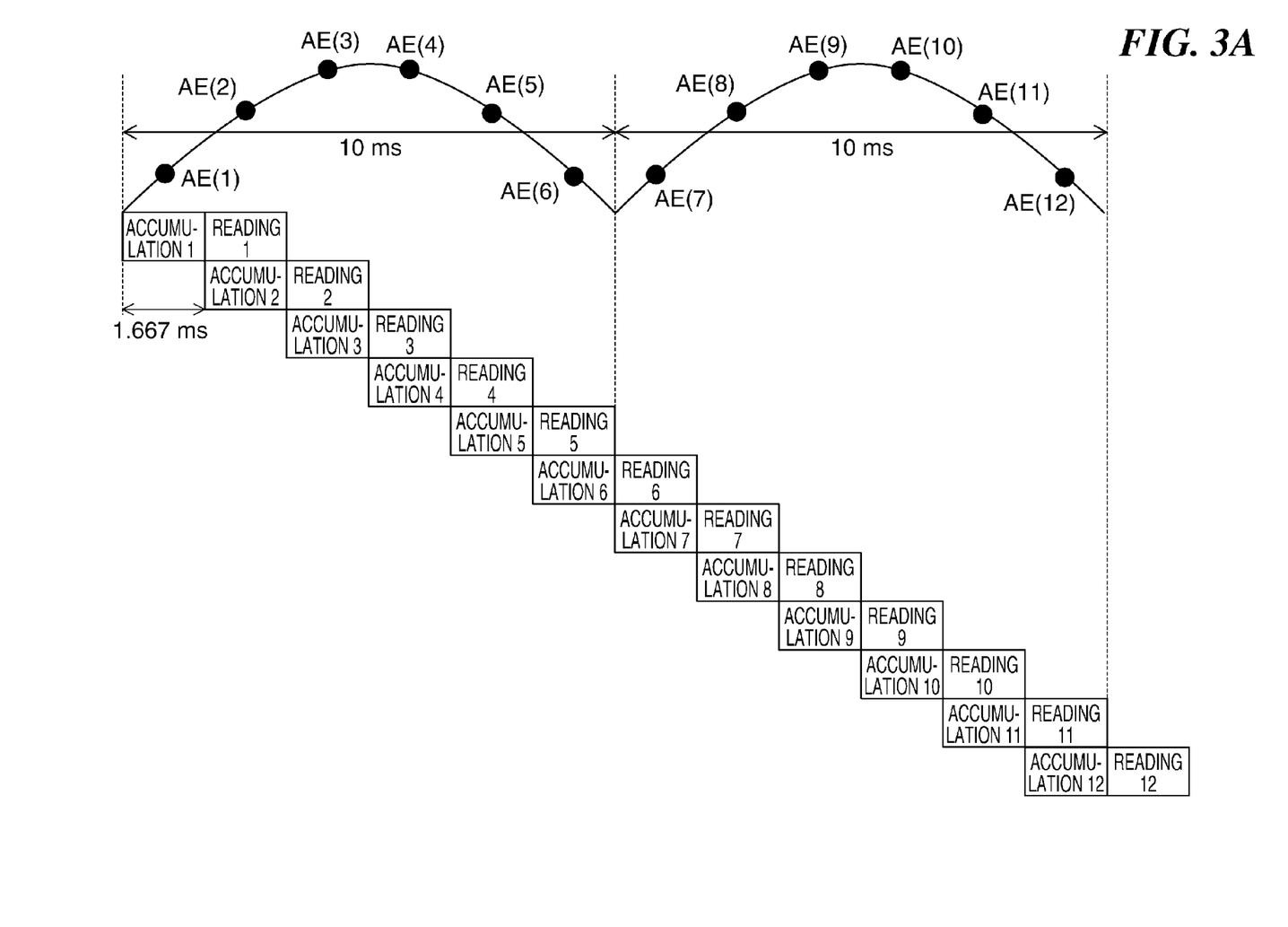
FIG. 3A is the diagram illustrating the electric charge accumulation and electric charge reading when a commercial power frequency is 50 Hz.
Figure 3B:
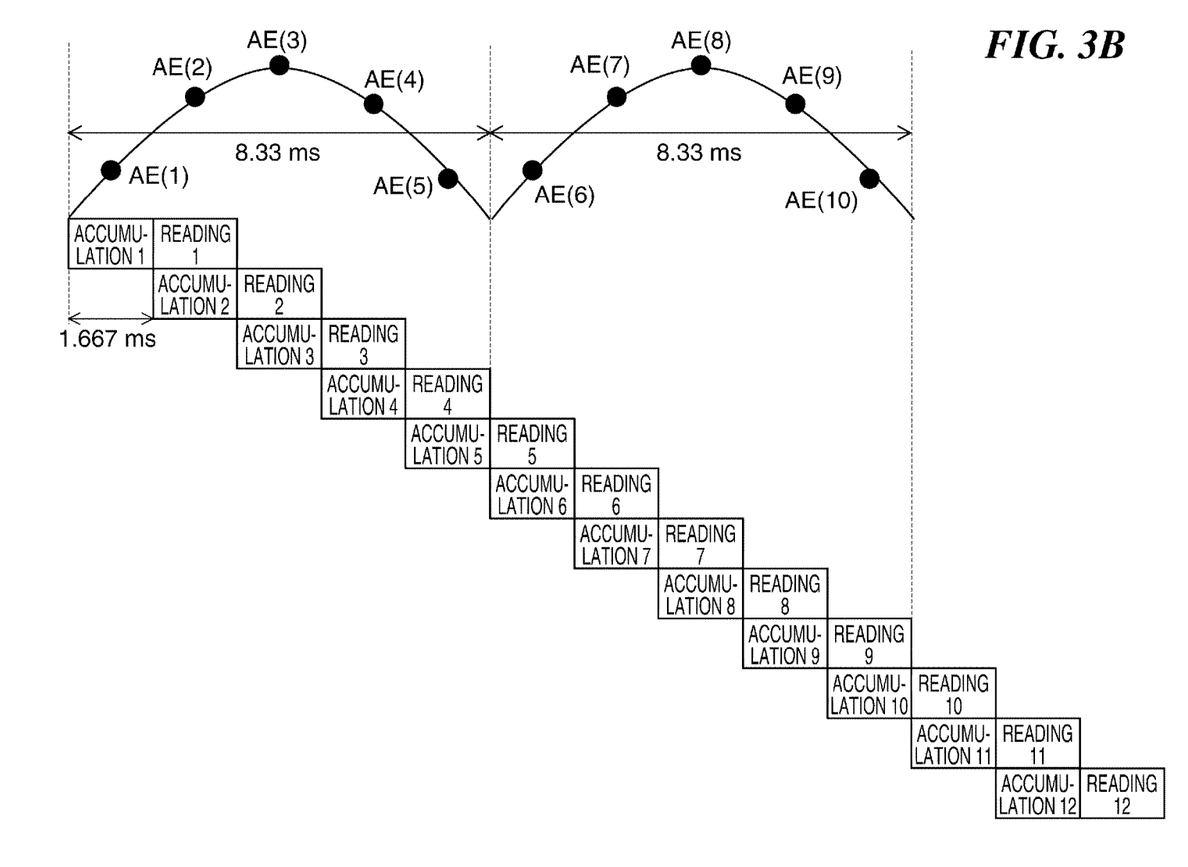
FIG. 3B is the diagram illustrating the electric charge accumulation and electric charge reading when the commercial power frequency is 60 Hz.

FIGS. 3A and 3B are diagrams for describing the electric charge accumulation and electric charge reading performed by the photometric sensor 108 illustrated in FIG. 1. Further, FIG. 3A is the diagram illustrating the electric charge accumulation and electric charge reading when the commercial power frequency is 50 Hz, and FIG. 3B is the diagram illustrating the electric charge accumulation and electric charge reading when the commercial power frequency is 60 Hz.

As illustrated in FIGS. 3A and 3B, the ICPU 112 controls the photometric sensor 108 and performs the electric charge accumulation and electric charge reading at, for example, 600 fps, that is, with a cycle of about 1.667 ms at the time of flicker detection. Further, the ICPU 112 successively performs the electric charge accumulation and electric charge reading 12 times.

The above-described 600 fps is a frequency of a common multiple of the frequency (100 Hz and 120 Hz) of the flicker light source which is estimated in advance. The ICPU 112 performs so-called pixel addition reading and thinning-out reading at the time of driving the photometric sensor 108 at about 600 fps (with a cycle of about 1.667 ms).

It should be noted that when the CCD sensor is used as the photometric sensor 108, it is difficult to perform partial reading in the CCD sensor, and thus, high-speed driving is performed due to pseudo reduction of the number of read lines through the pixel addition reading. On the other hand, when the CMOS sensor is used as the photometric sensor 108, it is possible to perform partial reading in a relatively easy manner in the CMOS sensor, and thus, the driving is performed such that a total time of the electric charge accumulation and electric charge reading is set to a cycle of about 1.667 ms through the thinning-out reading.

As described above, an electric charge accumulation time period of the photometric sensor 108 of the present embodiment is different depending on a process using an image to be acquired. To be specific, an electric charge accumulation time period of the photometric sensor 108 for acquiring an image to be used for the flicker detection and an electric charge accumulation time period of the photometric sensor 108 for acquiring an image to be used for the detection or tracking of a subject are different from each other.

Returning to FIG. 2 again, after the process of step S103, the camera microcomputer 101 performs a calculation process for the flicker detection (step S104). In the process of step S104, the camera microcomputer 101 performs a "determination process under the flicker environment" and a "flicker phase calculation process".

First, the determination process under the flicker environment will be described. The above-described FIG. 3A illustrates transition of the electric charge accumulation control and the photometric values when the commercial power frequency is 50 Hz. Here, an n-th accumulation is indicated by an "accumulation n", reading of the accumulation n is indicated by a "reading n", and a photometric value obtained by a result of the reading n is indicated by "AE(n)" It should be noted that n is any integer of 1 to 12.

When the commercial power frequency is 50 Hz, the flicker light emitting cycle is about 10 ms, and "10÷1.667≈6" is obtained. Accordingly, the same photometric value is obtained with a cycle of six times regardless of the timing of electric charge accumulation as illustrated in FIG. 3A. That is, a relation that AE(n)=AE(n+6) is established.

Similarly, FIG. 3B illustrates transition of the electric charge accumulation control and the photometric values when the commercial power frequency is 60 Hz. When the commercial power frequency is 60 Hz, the flicker light emitting cycle is about 8.33 ms, and "8.33/1.667≈5" is obtained. Accordingly, the same photometric value is obtained with a cycle of five times, and a relation that AE(n)=AE(n+5) is established as illustrated in FIG. 3B. On the other hand, AE(n) is constant regardless of n under the shooting environment without the flicker.

From the above description, an evaluation value F50 when the commercial power frequency is 50 Hz and an evaluation value F60 when the commercial power frequency is 60 Hz are defined as shown in Mathematical expression (1) and Mathematical expression (2), respectively.

[Mathematical expression 1]

$$F50 = \sum_{n=1}^{6} |AE(n) - AE(n+6)| \quad (1)$$

$$F60 = \sum_{n=1}^{6} |AE(n) - AE(n+5)| \quad (2)$$

Further, when the following Mathematical expression (3) is established using a threshold of Th_Flicker in order to determine whether it is under the flicker environment, the camera microcomputer 101 determines that it is not under the flicker environment (that is, no flicker).

$$F50 < Th\_Flicker, \text{ and } F60 < Th\_Flicker \quad (3)$$

Meanwhile, when the following Mathematical expression (4) is established, the camera microcomputer 101 determines that it is under the flicker environment in which the light emitting cycle T=10 ms (the commercial power frequency is 50 Hz).

$$F50 < Th\_Flicker, \text{ and } F60 \geq Th\_Flicker \quad (4)$$

In addition, when the following Mathematical expression (5) is established, the camera microcomputer 101 determines that it is under the flicker environment in which the light emitting cycle T=8.33 ms (the commercial power frequency is 60 Hz).

$$F50 \geq Th\_Flicker, \text{ and } F60 < Th\_Flicker \quad (5)$$

Meanwhile, there is a case in which both the evaluation values F50 and F60 exceed the threshold Th_Flicker according to panning or movement of a subject. In this case, the camera microcomputer 101 compares magnitudes of the evaluation values F50 and F60. Further, when the evaluation value F50≤the evaluation value F60, the camera microcomputer 101 determines that it is under the flicker environment in which the light emitting cycle T=10 ms (the commercial power frequency is 50 Hz). On the contrary, when the evaluation value F50>the evaluation value F60, the camera microcomputer 101 determines that it is under the flicker environment in which the light emitting cycle T=8.33 ms (the commercial power frequency is 60 Hz).

That is, when the following Mathematical expression (6) is established, and F50≤F60, the camera microcomputer 101 determines that it is under the flicker environment in which the light emitting cycle T=10 ms (the commercial power frequency is 50 Hz).

$$F50 \geq Th\_Flicker, \text{ and } F60 \geq Th\_Flicker \quad (6)$$

In addition, when the following Mathematical expression (6) is established, and F50>F60, the camera microcomputer 101 determines that it is under the flicker environment in which the light emitting cycle T=8.33 ms (the commercial power frequency is 60 Hz).

It should be noted that the camera microcomputer 101 may perform the flicker detection again assuming that the reliability of result of the flicker detection is low when Mathematical expression (6) is established.

Next, the flicker phase calculation process will be described. When a phase of the flicker is calculated, for example, the flicker phase may be obtained by interpolating photometric values, obtained by 12 times of the successive electric charge accumulation and electric charge reading, and calculating a peak timing at which the light amount of flicker is the highest.

Figure 4:
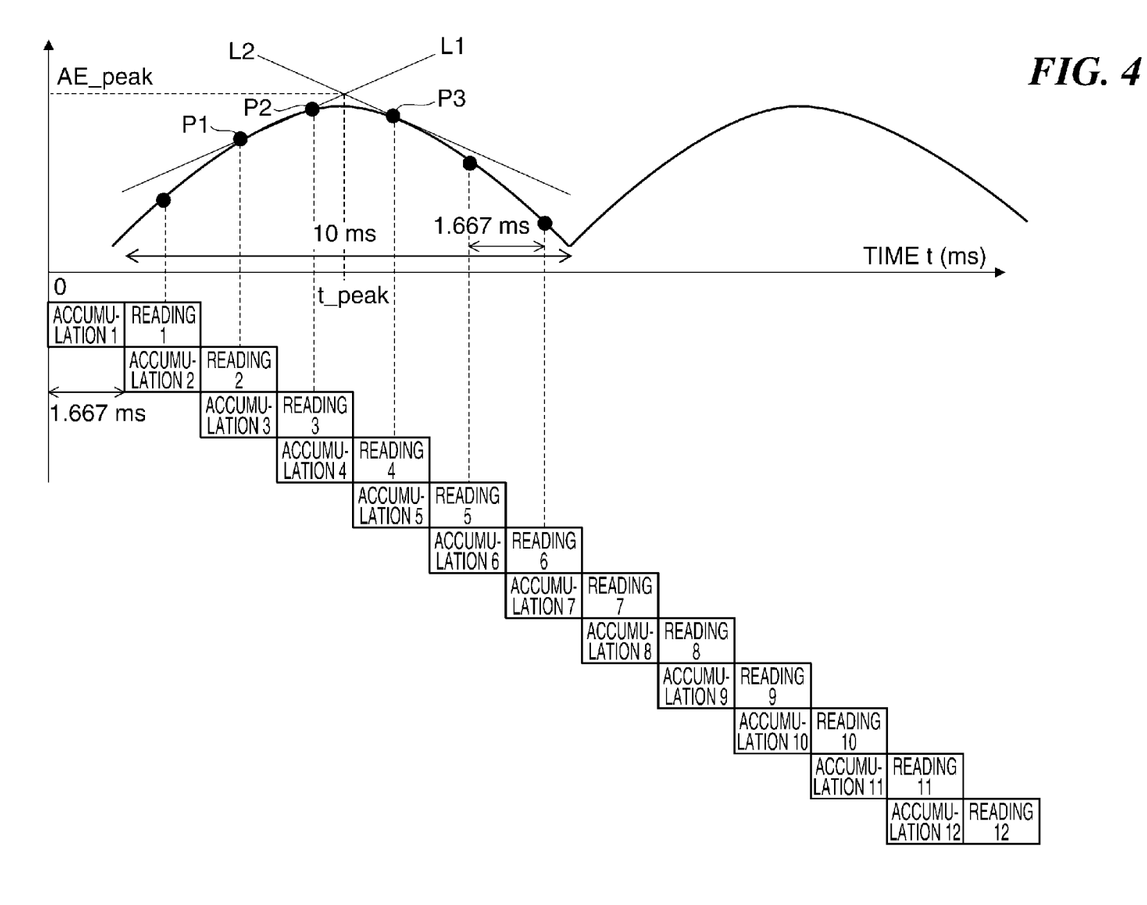
FIG. 4 is a diagram for describing an example of calculation of a peak timing of flicker which is performed by a camera microcomputer illustrated in FIG. 1.

FIG. 4 is a diagram for describing an example of calculation of a peak timing of the flicker which is performed by the camera microcomputer 101 illustrated in FIG. 1.

In FIG. 4, a point at which the maximum output (photometric result) is obtained among AE(2) to AE(11) illustrated in FIG. 3A is indicated by P2 (t(m), AE(m)). Further, a point that represents an immediately previous photometric result of the point P2 (t(m), AE(m)) is indicated by P1 (t(m−1), AE(m−1)). In addition, a point that represents an immediately subsequent photometric result of the point P2 (t(m), AE(m)) is indicated by P3 (t(m+1), AE(m+1)). It should be noted that m is any integer of 2 to 11.

A straight line that passes through two points including a point (the point P1 in the example illustrated in FIG. 4), which is smaller one between AE(m−1) and AE(m+1), and the point P2 is indicated by L1=at+b. Further, a straight line that passes through a point (the point P3 in the example illustrated in FIG. 4), which is the larger one between the point P1 and the point P3, and has slope of −a is indicated by L2. When an intersection between the straight lines L1 and L2 is obtained, it is possible to calculate a peak timing t_peak when a point in time of starting photometry for flicker is set to 0 ms, and a photometric value AE_peak at the peak timing.

Returning to FIG. 2 again, the camera microcomputer 101 determines whether it is under the flicker environment (the flicker is present) (step S105) after the process of step S104. When determining that the flicker is present (YES in step S105), that is, it is determined that it is "under the flicker environment in which the light emitting cycle is 10 ms" or "under the flicker environment in which the light emitting cycle is 8.33 ms", the camera microcomputer 101 performs a photometric sequence (first photometric sequence) that increases the frequency of the flicker detection (that is, decreases the frequency of the subject detection) (step S106).

On the contrary, when determining that the flicker is absent (NO in step S105), the camera microcomputer 101 performs a photometric sequence (second photometric sequence) that decreases the frequency of the flicker detection (that is, increases the frequency of the subject detection) (step S107).

After the process of step S106 or S107, the camera microcomputer 101 determines whether the shutter button is completely pressed, and a second shutter switch SW2 is turned on (step S108). When the second shutter switch SW2 is turned on (YES in step S108), the camera microcomputer 101 ends the flicker detection process, and transitions to a shooting operation. When the second shutter switch SW2 is in an OFF-state (NO in step S108), the camera microcomputer 101 returns the procedure to the process of step S105.

Figure 5A:
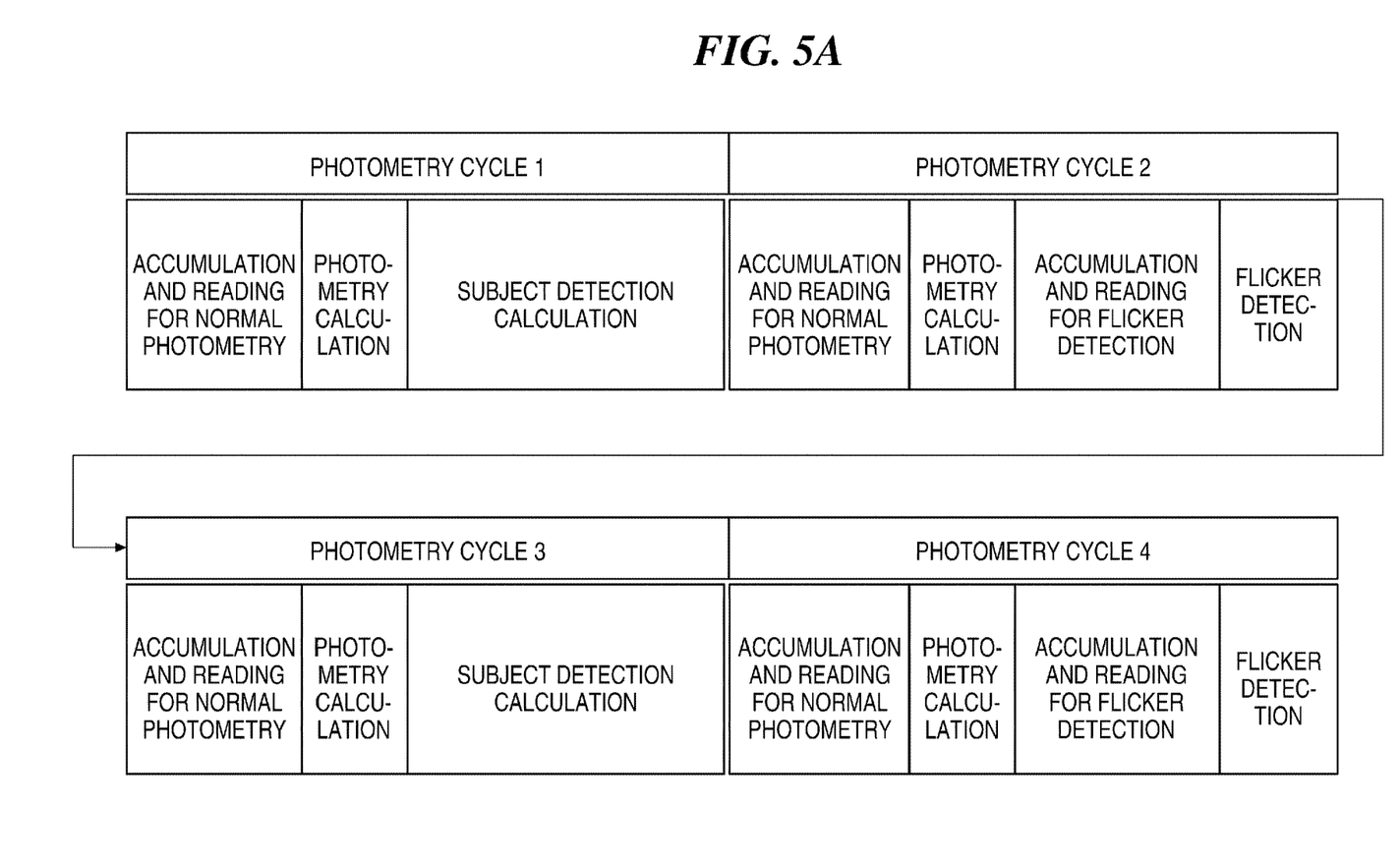
FIG. 5A is the diagram illustrating a first photometric sequence.
Figure 5B:
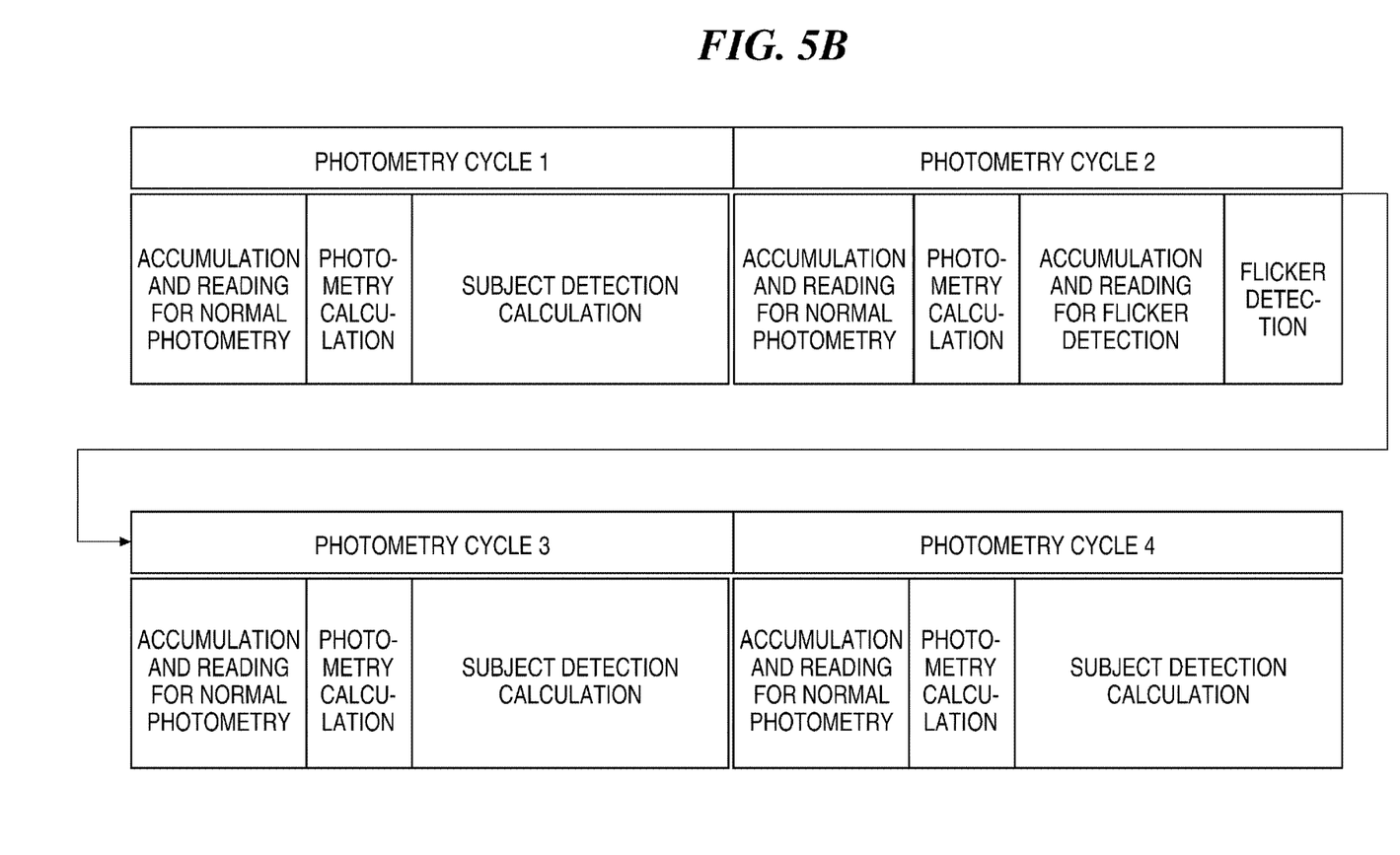
FIG. 5B is the diagram illustrating a second photometric sequence.

FIGS. 5A and 5B are diagrams for describing the photometric sequence illustrated in FIG. 2. Further, FIG. 5A is the diagram illustrating the first photometric sequence, and FIG. 5B is the diagram illustrating the second photometric sequence.

The camera microcomputer 101 controls the ICPU 112 to perform the flicker detection process or the subject detection process every detection cycle (every photometry cycle). The camera microcomputer 101 performs the general photometry and the subject detection calculation (subject detection process), which have been described in the process of step S102 illustrated in FIG. 2, in each of photometry cycles 1 and 3 in the first photometric sequence (that is, the photometric sequence that increases the frequency of the flicker detection) illustrated in FIG. 5A. It should be noted that the camera microcomputer 101 performs the subject detection process according to a photometric result obtained by the accumulation and reading for the general photometry.

In addition, the camera microcomputer 101 performs the general photometry in each of photometry cycles 2 and 4, and performs the flicker detection that has been described in the processes of step S103 and S104 illustrated in FIG. 2. It should be noted that it is desirable to set the cycle of the flicker detection to a cycle in which a flicker hardly influences on an image even when fluctuation in the commercial power frequency is maximum, that is, is deviated by ±0.3 Hz.

The camera microcomputer 101 performs the subject detection process in each of the photometry cycles 1, 3, and 4 in the second photometric sequence (that is, the photometric sequence that decreases the frequency of the flicker detection) illustrated in FIG. 5B. Further, the camera microcomputer 101 performs the flicker detection process in the photometry cycle 2.

It should be noted that the flicker detection process is performed once during the four photometry cycles in the second photometric sequence, but the flicker detection process may be performed once during the photometry cycles exceeding four times. Furthermore, the flicker detection process is not necessarily performed as the flicker is absent.

In this manner, the frequency to perform the flicker detection is increased when the flicker is detected in the first embodiment of the present invention, and thus, it is possible to appropriately perform the flicker detection process depending on the presence or absence of the flicker. To be specific, in the first embodiment of the present invention, the control is performed such that the frequency to perform the flicker detection is increased, and the frequency to perform the general photometry and the subject detection relating to the corresponding photometry is decreased in the case of detecting the flicker, and thus, it is possible to improve the accuracy in the flicker detection, the photometry, and the subject detection depending on the presence or absence of the flicker.

Next, a description will be given regarding an example of a camera according to a second embodiment of the present invention. It should be noted that the camera according to the second embodiment has the same configuration as the camera illustrated in FIG. 1.

Figure 6:
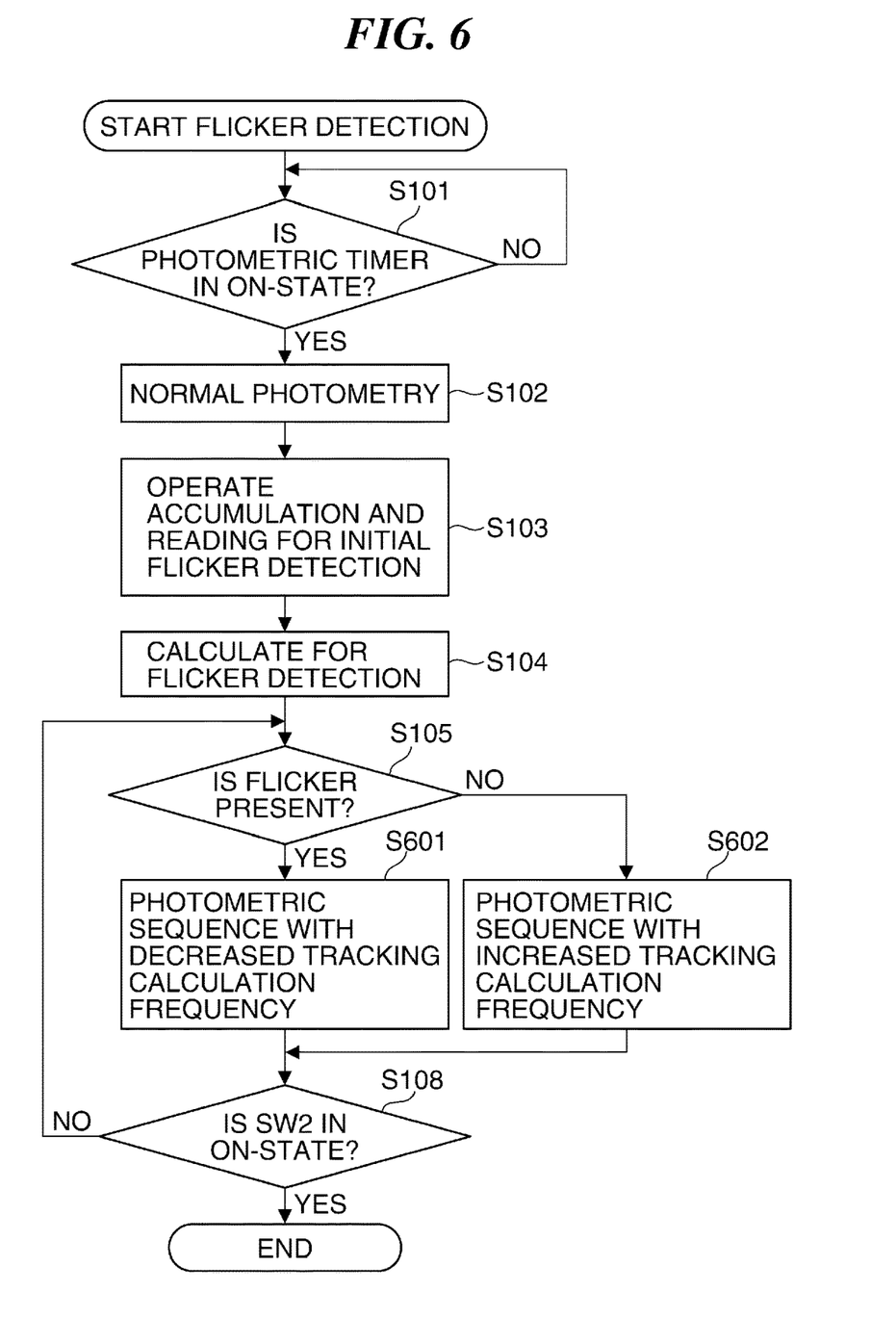
FIG. 6 is a flowchart for describing a flicker detection process which is performed by a camera according to a second embodiment of the present invention.

FIG. 6 is a flowchart for describing a flicker detection process which is performed by the camera according to the second embodiment of the invention. It should be noted that steps of the present flowchart illustrated in FIG. 6 that are the same as the steps of the flowchart illustrated in FIG. 2 are denoted by the same reference signs, and the description thereof will be omitted.

When determining that the flicker is present in step S105 (YES in step S105), the camera microcomputer 101 performs a photometric sequence (third photometric sequence) that decreases a frequency of subject tracking calculation (subject tracking process) (step S601). On the contrary, when determining that the flicker is absent (NO in step S105), the camera microcomputer 101 performs a photometric sequence (fourth photometric sequence) that increases the frequency of the subject tracking calculation (subject tracking process) (step S602). Further, the camera microcomputer 101 proceeds to the process of step S108 after the process of step S601 or S602.

Figure 7A:
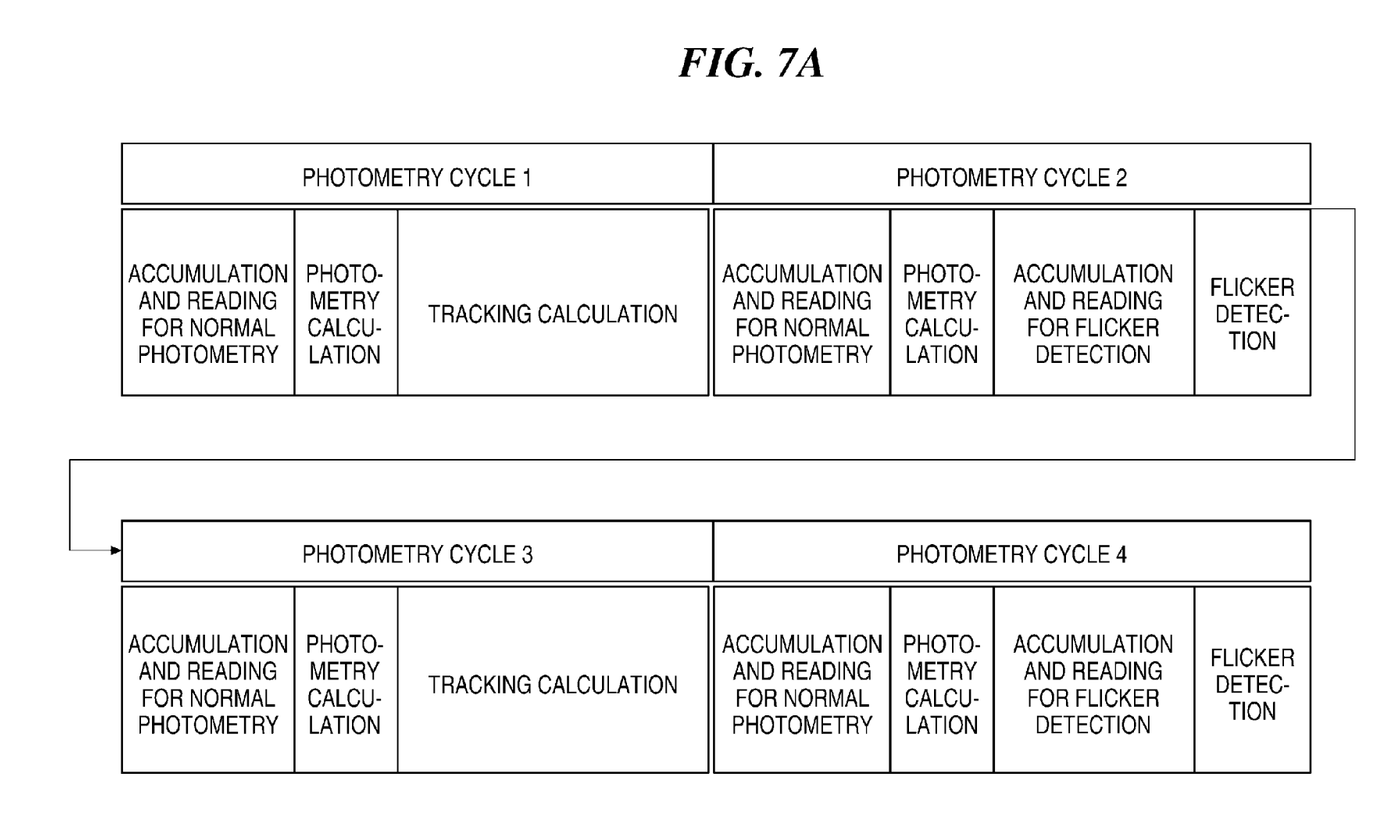
FIG. 7A is the diagram illustrating a third photometric sequence.
Figure 7B:
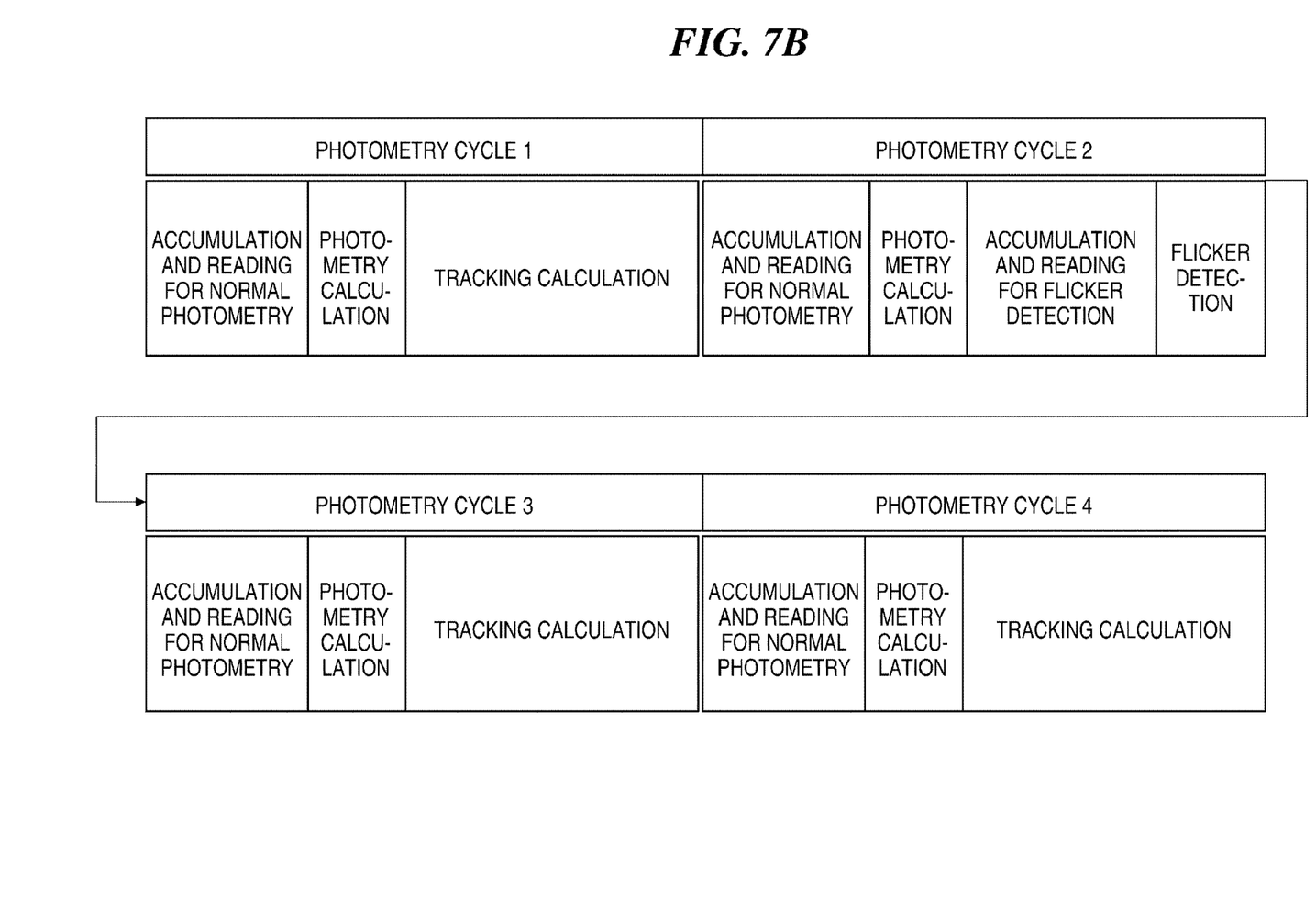
FIG. 7B is the diagram illustrating a fourth photometric sequence.

FIGS. 7A and 7B are diagrams for describing the photometric sequence illustrated in FIG. 6. Further, FIG. 7A is the diagram illustrating the third photometric sequence, and FIG. 7B is the diagram illustrating the fourth photometric sequence.

In the third photometric sequence (that is, the photometric sequence that decreases the frequency of the subject tracking process) illustrated in FIG. 7A, the camera microcomputer 101 performs the subject tracking and subject detection processes in each of the photometry cycles 1 and 3. In addition, the camera microcomputer 101 performs the flicker detection in each of the photometry cycles 2 and 4.

In the second photometric sequence (that is, the photometric sequence that increases the frequency of the subject tracking process) illustrated in FIG. 7B, the camera microcomputer 101 performs the subject tracking process in each of the photometry cycles 1, 3 and 4. Further, the camera microcomputer 101 performs the flicker detection process in the photometry cycle 2.

It should be noted that the flicker detection process is performed once during the four photometry cycles in the fourth photometric sequence, but the flicker detection process may be performed once during the photometry cycles exceeding four times. Furthermore, the flicker detection process is not necessarily performed (that is, may be stopped) as the flicker is absent. In addition, the above-described embodiment is configured such that the frequency for the subject detection process or the subject tracking process, which are the detection processes set in advance other than the detection process of detecting the change in brightness, is changed depending on the detection of the change in brightness (detection of the presence or absence of the flicker), but it may be configured to change a frequency for another detection process such as a light source detection process and a focus detection process, for example.

In this manner, the second embodiment of the present invention is also configured such that the frequency to execute the flicker detection is increased when the flicker is detected, and thus, it is possible to appropriately perform the flicker detection process depending on the presence or absence of the flicker. To be specific, in the second embodiment of the invention, the control is performed such that the frequency to perform the flicker detection is increased, and the frequency to perform the general photometry and the subject tracking relating to the corresponding photometry is decreased in the case of detecting the flicker, and thus, it is possible to improve the accuracy in the flicker detection, the photometry, and the subject tracking depending on the presence or absence of the flicker.

It should be noted in the above description that the ICPU 112 and the photometric sensor 108 function as a detection unit, and the camera microcomputer 101 functions as a control unit in the example illustrated in FIG. 1, but these units are not limited thereto. For example, a configuration in which the photometric sensor 108 and the camera microcomputer 101 function as the detection unit, and the ICPU 112 functions as the control unit may be employed.

It should be noted in the above-described embodiments that a configuration in which the setting of the frequency to perform the flicker detection and the subject detection, which are controlled according to an instruction of preparation for image pickup made by a user, is reset when the preparation for image pickup is cancelled may be employed. In addition, it may be configured such that the setting of the frequency is not reset until the power of the camera is turned off, and a configuration in which the setting of the frequency is reset when the second shutter switch is turned on may be employed.

Further, the description has been given in the above-described embodiments regarding the configuration in which the frequency to perform the flicker detection and the frequency to perform the photometry and the detection and tracking of the subject are controlled depending on the result of the flicker detection. With respect to this, it is possible to obtain the same effect as in the above-described embodiments as a result even by controlling the frequency to acquire an image to be used for the flicker detection or an image to be used for the photometry and the subject detection and tracking, for example.

To be specific, even when the camera microcomputer 101 is configured to control the frequency to acquire an image to be used for the flicker detection and the frequency to acquire an image to be used for the process set in advance (for example, the general photometry, the subject detection and tracking, or the like which are described above) other than the flicker detection based on the result of the flicker detection performed by the ICPU 112, it is possible to obtain the same effect as the effect obtained by the above-described embodiments.

In this case, the same configuration as in the above-described embodiments may be employed other than a point of controlling the frequency to acquire an image. To be specific, the camera microcomputer 101 performs a control such that the frequency to acquire an image to be used for the flicker detection is increased, and the frequency to acquire an image to be used for the process such as the general photometry and the subject detection is decreased in a case of detecting the flicker. In addition, the camera microcomputer 101 performs a control such that the frequency to acquire an image to be used for the flicker detection is decreased, and the frequency to acquire an image to be used for the process such as the general photometry and the subject detection is increased a the case of not detecting the flicker.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2015-157556, filed Aug. 7, 2015 which is hereby incorporated by reference wherein in its entirety.

What is claimed is:

1. An image pickup apparatus comprising:
at least one processor configured to execute a program stored in a memory, which functions as:
a detection unit configured to perform a detection process of detecting a flicker and a detection process set in advance other than the detection process of detecting the flicker based on an image acquired by picking up a subject; and
a control unit configured to control a frequency to perform the detection process of detecting the flicker and a frequency to perform the detection process set in advance using said detection unit depending on a detection result of the flicker performed by said detection unit at a time of picking up the subject,
wherein the detection process of detecting the flicker is a detection process of detecting at least a light amount change cycle of a flicker based on a plurality of images acquired in a charge accumulation period shorter than one cycle of the flicker,
wherein the detection process of detecting the flicker is performed in a period between successive detection processes set in advance, every predetermined cycle, and
wherein said control unit increases the frequency to perform the detection process of detecting the flicker using said detection unit when the detection result indicates that the flicker is present.

2. The image pickup apparatus according to claim 1 further comprising a sensor configured to output the image acquired by picking up the subject,
wherein said detection unit performs the detection process of detecting the flicker and the detection process set in advance based on the image output by said sensor.

3. The image pickup apparatus according to claim 2, wherein an image to be used for the detection process of detecting the flicker is different from an image to be used for the detection process set in advance.

4. The image pickup apparatus according to claim 1, wherein said control unit decreases the frequency to perform the detection process set in advance using said detection unit when the detection result indicates that the flicker is present.

5. The image pickup apparatus according to claim 4, wherein said control unit decreases the frequency to perform the detection process of detecting the flicker or stops the detection process of detecting the flicker using said detection unit, and increases the frequency to perform the detection process set in advance using said detection unit when the detection result indicates that the flicker is absent.

6. The image pickup apparatus according to claim 1, wherein said detection unit detects the subject or detects and tracks the subject as the detection process set in advance.

7. The image pickup apparatus according to claim 1, further comprising:
a sensor configured to output an image acquired by picking up the subject,
wherein when a preparation for image pickup is instructed, said detection unit performs the detection process of detecting the flicker and the detection process set in advance based on the image output by said sensor.

8. An image pickup apparatus comprising:
a sensor;
at least one processor configured to execute a program stored in a memory, which functions as:
a detection unit configured to execute a detection process of detecting flicker based on an image acquired using said sensor; and
a control unit configured to control a frequency to acquire an image using said sensor,
wherein the detection process of detecting the flicker is a detection process of detecting at least a light amount change cycle of a flicker based on a plurality of images acquired in a charge accumulation period shorter than one cycle of the flicker,
wherein said control unit controls a frequency to acquire an image to be used for the detection process of detecting the flicker and a frequency to acquire an image to be used for a process set in advance other than the detection process of detecting the flicker based on a detection result of said detection unit, and
wherein the detection process of detecting the flicker is performed in a period between successive detection processes set in advance, every predetermined circle.

9. The image pickup apparatus according to claim 8, wherein the process set in advance is a process of detecting a subject included in an image based on an image output from said sensor or a process for tracking a subject included in the image.

10. The image pickup apparatus according to claim 8, wherein the image to be used for the detection process of detecting the flicker is different from the image to be used for the process set in advance.

11. The image pickup apparatus according to claim 8,
wherein when the flicker is detected by said detection unit, said control unit performs control to increase the frequency to acquire the image to be used for the detection process of detecting the flicker and to decrease the frequency to acquire the image to be used for the process set in advance, and
wherein when the flicker is not detected by said detection unit, said control unit performs control to decrease the frequency to acquire the image to be used for the detection process of detecting the flicker and to increase the frequency to acquire the image to be used for the process set in advance.

12. The image pickup apparatus according to claim 8, wherein based on the detection result of said detection unit when a preparation for image pickup is instructed, said control unit controls the frequency to acquire the image to be used for the detection process of detecting the flicker and the frequency to acquire the image to be used for the process set in advance in a period while the preparation for image pickup is instructed.

13. The image pickup apparatus according to claim 12, wherein said control unit resets setting of a frequency to acquire an image using said sensor, in the period while the preparation for image pickup is instructed, in response to cancellation of the instruction of the preparation for image pickup.

14. A control method for an image pickup apparatus, the method comprising:
  a detection step of performing a detection process of detecting a flicker and a detection process set in advance other than the detection process of detecting the flicker based on an image acquired by picking up a subject; and
  a control step of changing a frequency to perform the detection process of detecting the flicker and a frequency to perform the detection process set in advance, which are performed in said detection step, depending on a detection result of the flicker performed in said detection step at a time of picking up the subject,
  wherein the detection process of detecting the flicker is a detection process of detecting at least a light amount change cycle of a flicker based on a plurality of images acquired in a charge accumulation period shorter than one cycle of the flicker,
  wherein the detection process of detecting the flicker is performed in a period between successive detection processes set in advance, every predetermined cycle, and
  wherein said control step increases the frequency to perform the detection process of detecting the flicker when the detection result in the detection step indicates that the flicker is present.

15. A computer-readable non-transitory storage medium storing a control program for causing a computer to execute a control method for an image pickup apparatus, the control method comprising:
  a detection step of performing a detection process of detecting a flicker and a detection process set in advance other than the detection process of detecting the flicker based on an image acquired by picking up a subject; and
  a control step of changing a frequency to perform the detection process of detecting the flicker and a frequency to perform the detection process set in advance, which are performed in said detection step, depending on a detection result of the flicker performed in said detection step at a time of picking up the subject,
  wherein the detection process of detecting the flicker is a detection process of detecting at least a light amount change cycle of a flicker based on a plurality of images acquired in a charge accumulation period shorter than one cycle of the flicker,
  wherein said detection process of detecting the flicker is performed in a period between successive detection processes set in advance, every predetermined cycle, and
  wherein said control step increases the frequency to perform the detection process of detecting the flicker when the detection result in the detection step indicates that the flicker is present.

16. A control method for an image pickup apparatus provided with a sensor, the method comprising:
  a detection step of executing a detection process of detecting a flicker based on an image acquired using said sensor; and
  a control step of controlling a frequency to acquire an image using the sensor,
  wherein the detection process of detecting the flicker is a detection process of detecting at least a light amount change cycle of a flicker based on a plurality of images acquired in a charge accumulation period shorter than one cycle of the flicker,
  wherein a frequency to acquire an image to be used for the detection process of detecting the flicker and a frequency to acquire an image to be used for a process set in advance other than the detection process of detecting the flicker are controlled in said control step based on a detection result in said detection step, and
  wherein the detection process of detecting the flicker is performed in a period between successive detection processes set in advance, every predetermined circle.

17. A computer-readable non-transitory storage medium storing a control program for causing a computer to execute a control method for an image pickup apparatus provided with a sensor, the control method comprising:
  a detection step of executing a detection process of detecting a flicker based on an image acquired using said sensor; and
  a control step of controlling a frequency to acquire an image using the sensor,
  wherein the detection process of detecting the flicker is a detecting process of detecting at least a light amount change cycle of a flicker based on a plurality of images acquired in a charge accumulation period shorter than one cycle of the flicker,
  wherein a frequency to acquire an image to be used for the detection process of detecting the flicker and a frequency to acquire an image to be used for a process set in advance other than the detection process of detecting the flicker are controlled in said control step based on a detection result in said detection step, and
  wherein the detection process of detecting the flicker is performed in a period between successive detection processes set in advance, every predetermined circle.

* * * * *